Figure 1:
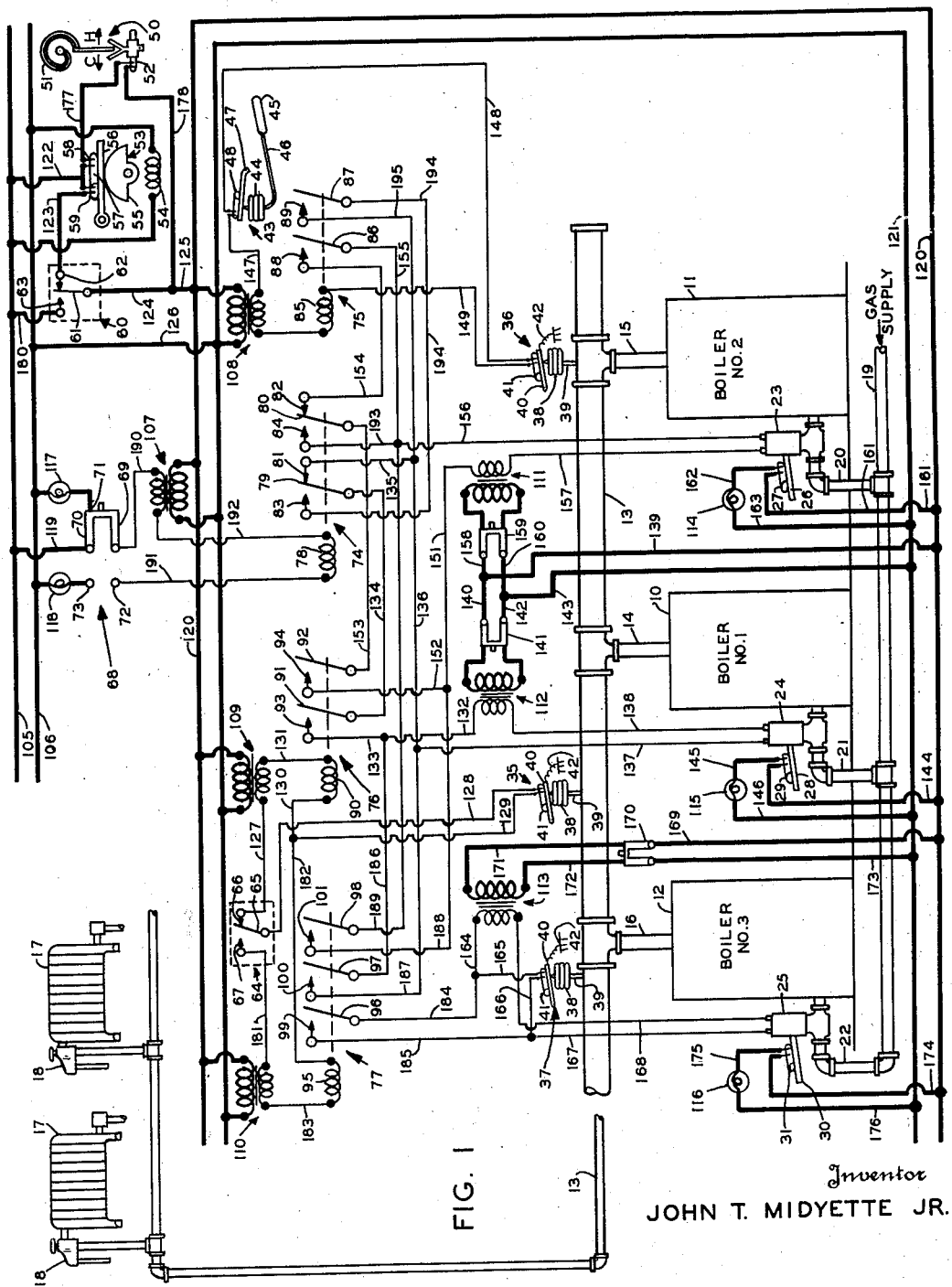

June 15, 1937.  J. T. MIDYETTE, JR  2,083,612
TEMPERATURE CHANGING SYSTEM EMPLOYING PLURAL TEMPERATURE CHANGING DEVICES
Filed May 2, 1934

Inventor
JOHN T. MIDYETTE JR.

By George H. Fisher
Attorney

Patented June 15, 1937

2,083,612

UNITED STATES PATENT OFFICE 2,083,612

TEMPERATURE CHANGING SYSTEM EMPLOYING PLURAL TEMPERATURE CHANGING DEVICES

John T. Midyette, Jr., Brooklyn, N. Y., assignor to Minneapolis-Honeywell Regulator Company, Minneapolis, Minn., a corporation of Delaware Application May 2, 1934, Serial No. 723,490

25 Claims. (Cl. 236—1)

The present invention relates to the controlling of a plurality of temperature changing devices in such manner as to more nearly maintain the temperature of a building, or the like, at the desired temperature.

One of the objects of the present invention is the provision of an automatic control system by which a first temperature changing device is operated at a predetermined capacity whereby, under average or mild weather conditions, the temperature of the building is maintained at a comfortable value together with a second temperature changing device which is operated at a predetermined capacity in the event the outdoor temperature reaches a predetermined value indicating more severe weather conditions and provided the first temperature changing device is not operating at a sufficient capacity to supply the demands of the building.

A further object of the invention is the provision of a third temperature changing device which is operated irrespective of the outdoor temperature if the first temperature changing device is unable to take care of the demands during mild weather or if the first and second temperature changing devices are unable to supply the demands thereon during more severe weather.

Another object of the invention is the provision of means whereby either of two temperature changing devices may be selectively automatically controlled as the primary temperature changing device and the remaining temperature changing device operated as the secondary or supplemental temperature changing device in the manner set forth above.

Another object of the invention is the provision of time controlled means whereby at certain times, for example at night, the temperature changing devices can only be operated provided there is a demand for a change in temperature as indicated by a temperature responsive device which responds to the temperature of one of the spaces under control.

Another object of the invention is the provision of manual means whereby the time controlled means and temperature responsive device can be rendered inoperative and/or the temperature changing devices can be manually controlled, if desired.

More specifically, the invention comprises the provision of three boilers, the first of which operates to maintain a predetermined steam supply pressure, the second of which is operated to produce more steam provided the outdoor temperature falls below a predetermined value and the steam supply pressure falls below the value above which it is supposed to be maintained by the first boiler, and the third of which is operated irrespective of the outdoor temperature if the steam supply pressure falls to a still lower value. Manual means are provided whereby either one of two of the boilers may be utilized as the primary boiler and whereby all three boilers may be controlled manually, if desired. Furthermore, a timer is so arranged as to place a space temperature responsive thermostat in control of the boilers at certain times and manual means are provided for rendering both the timer and thermostat inoperative, if desired. In the preferred form of the invention, there are further control devices for controlling the flow of steam to the various heating devices although such controls may not be necessary in all instances.

Further objects of the invention will be found in the drawing, the accompanying description and the appended claims.

For a more complete understanding of the invention, reference may be had to the following detailed description and the accompanying single drawing which is a schematic showing of one form of the present invention.

Referring to the single drawing, a plurality of temperature changing devices, indicated at 10, 11 and 12, are herein shown as comprising steam boilers which are connected to a steam main 13 by means of pipes 14, 15 and 16. The main 13 is connected to a plurality of radiators 17 by suitable piping arrangements. It will be understood that the radiators 17 are located in various rooms or compartments of a building, or the like, wherein it is desired to control the temperature of the individual rooms or compartments and the flow of steam to each of the radiators 17 from the main 13 is herein shown as being controlled by individual self-contained thermostatic radiator valves 18 which may take the form of those shown in Paul F. Shivers Patent No. 1,916,814 which issued July 4th, 1933. It is to be clearly understood that the particular manner in which any one of the radiators 17 is controlled so as to maintain the desired space temperature has no particular bearing upon the present invention and the individual self-contained thermostatic radiator valves 18 shown herein are merely exemplary of one of the many manners in which the radiators 17 may be controlled. It will also be understood that the complete steam heating system will be provided with the usual and necessary returns, traps, equalizers, etc. all as is well-known in the art.

The boilers 11, 10 and 12 are herein shown as fired by gas which is supplied by a main gas supply pipe 19, having branch pipes 20, 21 and 22 which lead to the respective boilers 10, 11 and 12 through suitable electrically controlled gas valves 23, 24 and 25. The gas valve 23 operates an auxiliary arm 26 which carries a mercury switch 27, the arrangement being such that mercury switch 27 closes a circuit when the valve 23 is opened so as to admit gas to boiler 11. Similarly, gas valve 24 controls an arm 28 which, in turn, carries a mercury switch 29 and gas valve 25 controls an arm 30 which carries a mercury switch 31.

The primary controls for the various boilers 10, 11 and 12 comprise pressure responsive switching mechanisms generally indicated at 35, 36 and 37. Each of these pressure responsive switching mechanisms includes a pressure responsive device in the form of a bellows 38 all of which are connected to steam main 13 by suitable pipes 39. The bellows 38 engage pivoted arms 40, each of which carries a mercury switch 41, the arms being biased against movement by expansion of bellows 38 by means of springs 42. The pressure responsive switching mechanism 35, in the specific system to be hereinafter described in detail, is so arranged that its mercury switch 41 closes when the pressure is steam main 13 falls to approximately 2# and is moved to open position when the boiler pressure rises to approximately 3#. Similarly, the mercury switch 41 of pressure responsive switching mechanism 36 moves to closed position when the pressure in steam main 13 falls to approximately 1½# and moves to open position when the pressure in steam main 13 rises to 3#, whereas the mercury switch 41 of pressure responsive switching mechanism 37 moves to closed position when the pressure in steam main 13 falls to approximately 1# and moves to open position when the steam pressure in main 13 rises to 3#. Such pressure responsive switching mechanisms having adjustable basic settings and adjustable differential settings are well-known in the art and may well take the general form shown in Louis A. M. Phelan Patent No. 1,747,153 which issued February 11th, 1930.

In addition to these three pressure responsive switching mechanisms, the primary controls include a temperature responsive switching mechanism which is herein shown as comprising a volatile fluid type thermostat indicated generally at 43. This volatile fluid thermostat comprises a bellows 44, a remote control bulb 45 and a connecting capillary tubing 46 which are charged with the proper amount of the required type of volatile fluid. The bellows 44 operates a pivoted arm 47 which carries a mercury switch 48. In the particular system being described, the remote control bulb 45 is placed out-of-doors whereby the mercury switch 48 is controlled in accordance with changes in outdoor temperature. The setting of this outdoor temperature responsive switching mechanism 43 is preferably such that mercury switch 48 closes when the outdoor temperature falls to say 40° F. and opens upon a slight increase in outdoor temperature. This temperature responsive switching mechanism 43 may take the general form shown in Louis A. M. Phelan Patent No. 1,651,629 which issued December 6th, 1927.

The system of the present invention also includes several supplemental or auxiliary controls, some of which provide for varied operation at different times of day or night. A night thermostat which is generally indicated at 50 comprises a bimetallic actuating element 51 that operates a mercury switch 52, the arrangement being such that the mercury switch 52 is moved to closed position when the temperature to which bimetallic element 51 is subjected falls to some minimum temperature such as 60° F.

A time operated switching mechanism, generally indicated at 53, is herein shown as comprising a timing motor, having an energizing winding 54, which drives a cam 55 at the speed of one revolution in twenty-four hours through suitable reduction gearing (not shown). The timer cam 55 operates an arm 56 which carries a mercury switch 57 having a first pair of electrodes 58 at one end and a second pair of electrodes 59 at the other end.

A further auxiliary control comprises a manual switch, generally indicated at 60, which includes a manually operable switch arm 61 that is selectively engageable with fixed contacts 62 and 63. Similarly, a second manual switch 64 comprises a manually operable switch arm 65 which is selectively engageable with fixed contacts 66 and 67. A third manual switch 68 comprises a pair of manually operable switch arms 69 and 70. In the position shown switch arm 69 is not engaged with any contact whatsoever, whereas the switch arm 70 is engaged with a contact 71. When the arms 69 and 70 are thrown to their other positions, they respectively engage contacts 72 and 73.

The various controls above described are operative to control four relays generally indicated at 74, 75, 76 and 77. The relay 74 comprises a relay coil 78 which, upon energization, attracts switch arms 79 and 80 so as to move the same from engagement with respective contacts 81 and 82 and into engagement with respective contacts 83 and 84. The relay 75 comprises a relay coil 85 which, when energized, moves switch arms 86 and 87 into engagement with contacts 88 and 89 respectively. The relay 76 comprises a relay coil 90 which, when energized, moves switch arms 91 and 92 into engagement with contacts 93 and 94 respectively. The relay 77 comprises a relay coil 95 which, when energized moves switch arms 96, 97 and 98 into engagement with respective contacts 99, 100 and 101.

Electrical power is supplied to the system by mains 105 and 106. Low voltage power is supplied, under certain conditions to be hereinafter described, to relays 74, 75, 76 and 77 by means of step down transformers 107, 108, 109 and 110, while low voltage power is supplied to gas valves 23, 24 and 25, under certain conditions also to be hereinafter described, by means of step down transformers 111, 112 and 113.

In addition to the apparatus already described, the gas valves 23, 24 and 25 are provided with respective pilot lights 114, 115 and 116. Two other pilot lights indicated at 117 and 118 are also provided.

The remaining circuit connections will be described under "Operation."

*Operation*

With the parts in the position shown, the pressure in steam main 13 has recently been at or above 3# and has not since fallen below 2# as indicated by the fact that pressure responsive switching mechanisms 35, 36 and 37 all have their respective mercury switches 41 in open circuit position. Also, the outdoor temperature is above 40° F. since the mercury switch 48 of outdoor temperature responsive switching mechanism 43 is in its open circuit position. The apparatus is operating on a day cycle with the result that a circuit is closed between the electrodes 59 of mercury switch 57. The apparatus is operating under automatic control since switch arms 61 and 65 are respectively engaged with contacts 62 and 66. Pilot light 117 is energized by a circuit which flows from main 105, through wire 119, switch arm 70, contact 71, and pilot light 117 to main 106. The relay coil 78 of relay 74 is deenergized since switch arm 69 is disengaged from contact 72 and boiler 10 is operating as the primary temperature changer.

With the parts in these positions, line wires 120 and 121 will be constantly energized by a circuit as follows: main 105, wire 122, electrodes 59 of timer switch 57, wire 123, contact 62 and switch arm 61 of manual switch 60, wire 124 and wire 125 to line 120 and from line 121 by way of wire 126 to main 106. As a result, the transformers 107, 108, 109, 110, 111, 112 and 113 are all energized.

After a time, the steam flow to the radiators 17 through the individual self-contained thermostatic radiator valves 18 will cause the pressure in steam main 13 to fall to 2#, or thereabouts, whereupon mercury switch 41 of pressure responsive switching mechanism 35 will move to closed position. When this occurs, relay coil 90 of relay 76 will be energized as follows: secondary of transformer 109, wire 127, contact 66 and switch arm 65 of manual switch 64, wire 128, pressure responsive switching mechanism 35, wire 129, wire 130, relay coil 90, and wire 131 back to the secondary of transformer 109. Energization of relay coil 90 moves switch arms 91 and 92 into engagement with contacts 93 and 94. Movement of switch arm 91 into engagement with contact 93 energizes gas valve 24 as follows: secondary of transformer 112, wire 132, wire 133, contact 93, switch arm 91, wire 134, switch arm 79 and contact 81 of relay 74, wire 135, wire 136, wire 137, gas valve 24 and wire 138 to the other side of the secondary of transformer 112, it being noted that the primary of transformer 112 is connected to line wires 120 and 121 by means of wires 139, 140, manual switch 141, wire 142, and wire 143. Opening of gas valve 24 renders boiler 10 operative and also moves mercury switch 29 to closed position whereupon pilot light 115 is energized as follows: line 120, wire 144, mercury switch 29, wire 145, pilot light 115, and wire 146 to line wire 121. If operation of boiler 10 is sufficient to restore the steam pressure in main 13 to 3#, the mercury switch 41 of pressure responsive switching mechanism 35 will again move to open position whereupon gas valve 24 and pilot light 115 will be deenergized. In this manner, as long as the pressure in main 13 does not go below 2#, the pressure responsive switching mechanism 35 will intermittently operate boiler 10 to maintain the pressure in steam main 13 between 2# and 3#.

Assuming now that the outdoor temperature decreases below 40° F. so that mercury switch 48 moves to closed circuit position, this decrease in outdoor temperature will place a larger demand for steam upon the system and this demand may become great enough that boiler 10, even when operating continuously, is of insufficient capacity to maintain the steam pressure above 1½#. If such a condition arises, and the steam pressure in main 13 drops to 1½#, mercury switch 41 of pressure responsive switching mechanism 36 will move to closed circuit position and, providing the outdoor temperature is still below 40° F. so that mercury switch 48 is also in closed circuit position, relay coil 85 of relay 75 will be energized by the following circuit: secondary of transformer 108, wire 147, mercury switch 48, wire 148, pressure responsive switching mechanism 36, wire 149, relay coil 85, and wire 150 to the other side of the secondary of transformer 108. Switch arms 86 and 87 will therefore be moved into engagement with contacts 88 and 89. Engagement of switch arm 86 with contact 88 will energize gas valve 23 by the following circuit: from the secondary of transformer 111 to wire 151, wire 152, contact 94 and switch arm 92 of relay 76 (relay 76 will be energized as hereinbefore described since the pressure in steam main 13 is below 2#) wire 153, switch arm 80 and contact 82 of relay 74, wire 154, contact 88 and switch arm 86 of relay 75, wire 155, wire 156, gas valve 23, and wire 157 to the other side of the secondary of transformer 111, it being noted that transformer 111 is connected to line wires 120 and 121 by wires 139, 158, manual switch 159, wire 160, and wire 143. Energization of gas valve 23 places boiler 11 into operation and closes mercury switch 27 whereupon pilot light 114 is energized as follows: line 120, wire 161, mercury switch 27, wire 162, pilot light 114, and wire 163 to line 121. If the outdoor temperature has not become extremely low, the conjoint operation of boilers 10 and 11 will be sufficient to restore the pressure in steam main 13 to 3# whereupon gas valves 24 and 23 and their respective pilot lights will all be deenergized. Upon a subsequent lowering in the pressure in steam main 13, gas valve 24 will be energized at a pressure of 2# as hereinbefore described and gas valve 23 will be energized if the pressure continues to fall until it reaches 1½#. In this manner, boiler 11 will cooperate with boiler 10 to maintain the pressure in steam main 13 above 1½# when the outside temperature falls below 40° F. if the capacity of boiler 10 is insufficient to maintain the pressure above this value.

If the pressure in steam main 13 falls to 1#, then mercury switch 41 of pressure responsive switching mechanism 37 will close whereby gas valve 25 will be energized irrespective of outdoor temperature. The energizing circuit for gas valve 25 is as follows: secondary of transformer 113, wire 164, wire 165, pressure responsive switching mechanism 37, wire 166, wire 167, gas valve 25 and wire 168 to the other side of the secondary of transformer 113, it being noted that the primary thereof is connected to line wires 120 and 121 by means of wire 169, manual switch 170, wire 171, wire 172, and wire 173. Energization of gas valve 25 places boiler 12 in operation and closes mercury switch 31 whereupon pilot light 116 is energized as follows: line 120, wire 174, mercury switch 31, wire 175, pilot light 116, and wire 176 to line 121. Gas valve 25 will thereupon remain energized until the pressure in main 13 has been returned to 3#, whereupon pressure responsive switching mechanism 37 will open its switch 41 to deenergize gas valve 25 and its pilot light 116.

From the foregoing, it will be apparent that during the day cycle, a primary boiler (10) endeavors to maintain a sufficient supply of steam to take care of the demands of the radiators 17 by maintaining the pressure in main 13 between 2# and 3#. If the demand should increase to such an extent that the pressure in main 13 decreases to 1# for any reason whatsoever, an auxiliary boiler (12) will be placed in operation to supplement the action of primary boiler. Likewise, if the demand should increase so as to reduce the pressure in steam main 13 to 1½# and, if the increase in demand is accompanied by a lowering in the outdoor temperature to some predetermined value, then a secondary boiler (11) will be placed in operation to supplement the action of the primary boiler.

Many buildings are entirely unoccupied at night wherefore it is desirable to maintain a lower temperature therein at night than during the day. In the system of the present invention, at night the timer 53 operates cam 55 to such position that the circuit through electrodes 59 of mercury switch 57 is broken and the circuit through electrodes 58 thereof is completed. Under these conditions, lines 120 and 121 are only energized at such times as mercury switch 52 of the night thermostat 50 is in closed circuit position. The connections between mains 105 and 106 and lines 120 and 121 under these conditions are as follows: main 105, wire 122, electrodes 58 of timer switch 57, wire 177, switch 52 of night thermostat 50, wire 178, and wire 125 to line 120 and then from line 121 to main 106 by way of wire 126. It will therefore be noted that during the night cycle, the boilers 10, 11 and 12 are operated in the same manner as previously explained in connection with the day cycle except that they can be operated only at such times as the temperature at the night thermostat 50 is sufficiently low to cause its switch 52 to move to its closed circuit position. It is contemplated that the night thermostat 50 will be placed in some one of the rooms or compartments of the building which gives a fair indication of the temperatures in the remaining portions of the building or the lowest temperature therein.

Occasionally the building may be occupied at night so that it is desired to have the system operate in the same manner as during the day. In such event, this can be accomplished by moving switch arm 61 into engagement with contact 63 of manual switch 60. When this is done, mains 105 and 106 are continuously connected to line wires 120 and 121 in the following manner: main 105, wire 180, contact 63, switch arm 61, wire 124, and wire 125 to line 120 and from line 121 to main 106 by way of wire 126.

Under some conditions it may be desired to operate all three boilers 10, 11 and 12 under the command of a single pressure responsive switching mechanism and independent of all other conditions. In this event, switch arm 61 is moved into engagement with contact 63 as previously explained so that lines 120 and 121 are continuously energized. In addition, switch arm 65 is moved into engagement with contact 67 of manual switch 64. Relay coil 95 of relay 77 is thereupon energized as follows: secondary of transformer 110, wire 181, contact 67, switch arm 65, wire 128, switch 41 of pressure responsive switching mechanism 35, wire 129, wire 182, relay coil 95, and wire 183 to the other side of the secondary of transformer 110.

Energization of relay coil 95 moves switch arms 96, 97 and 98 into engagement with contacts 99, 100 and 101 respectively. Engagement of switch arm 96 with contact 99 energizes gas valve 25 of boiler 12 as follows: secondary of transformer 113, wire 164, wire 184, switch arm 96, contact 99, wire 185, wire 167, gas valve 25, and wire 168 to the other side of secondary of transformer 113. Boiler 12 will therefore be placed in operation and its pilot light 116 will be energized in the manner hereinbefore pointed out. Engagement of switch arm 97 with contact 100 energizes gas valve 24 of boiler 10 as follows: secondary of transformer 112, wire 132, wire 186, switch arm 97, contact 100, wire 187, wire 137, gas valve 24, and wire 138 to the other side of the secondary of transformer 112. Energization of gas valve 24 places boiler 10 in operation and energizes its pilot light 115 as heretofore explained. Engagement of switch arm 98 with contact 101 energizes gas valve 23 of boiler 11 as follows: secondary of transformer 111, wire 151, wire 188, contact 101, switch arm 98, wire 189, wire 156, gas valve 23, and wire 157 to the other side of the secondary of transformer 111. Energization of gas valve 23 places boiler 11 in operation and energizes its pilot light 114 as above described. In this manner all three boilers may be operated under the command of a single pressure responsive switching mechanism to maintain the pressure in main 13 between 2# and 3#.

Now referring back to the normal automatic daytime cycle and, for that matter to the night cycle, it will be noted that boiler 10, the primary boiler, is operating a much greater percentage of the time than are boilers 11 and 12. It may be desirable to be able to make one of the other boilers operate as the primary temperature changer at times so as to somewhat equalize the operating periods of the various boiler. In the system shown herein, boilers 10 and 11 can be interchanged as primary and secondary boilers or temperature changers. If it is desired to place boiler 11 under the control of pressure responsive switching mechanism 35 and boiler 10 under the combined control of pressure responsive switching mechanism 36 and outdoor temperature responsive switching mechanism 43, manual switch 68 is thrown to the position opposite that shown wherein switch arm 70 engages contact 73 and switch arm 69 engages contact 72. Pilot light 117 will now be deenergized and pilot light 118 will be energized from main 105 through wire 119, switch arm 70, contact 73, and through pilot light 118 to main 106 whereby it indicates that boiler 11 is now the primary temperature changer. Engagement of switch arm 69 with contact 72 energizes relay coil 78 whenever lines 120 and 121 are energized. This circuit is as follows: secondary of transformer 107, wire 190, switch arm 69, contact 72, wire 191, relay coil 78, and wire 192 to the other side of the secondary of transformer 107. Energization of relay coil 78 moves switch arms 79 and 80 from engagement with contacts 81 and 82 and into engagement with contacts 83 and 84.

Now whenever the pressure in steam main 13 falls to 2# resulting in closure of switch 41 of pressure responsive switching mechanism 35 so as to energize relay coil 90 of relay 76 as heretofore explained. gas valve 23 will be energized as follows: secondary of transformer 111, wire 151, wire 152, contact 94, switch arm 92, wire 153, switch arm 80, contact 84, wire 193, wire 156, gas valve 23, and wire 157 to the other side of the secondary of transformer 111. Boiler 11 is thereby placed into operation instead of boiler 10 and its proper pilot light 114 is energized in the manner heretofore described. In the event the boiler pressure falls to 1½# and the outdoor temperature falls below 40° F. so as to energize relay coil 85 of relay 75 in the manner heretofore described, gas valve 24 will be energized as follows: secondary of transformer 112, wire 132, wire 133, contact 93, switch arm 91, wire 134, switch arm 79, contact 83, wire 194, switch arm 87, contact 89, wire 195, wire 136, wire 137, gas valve 24 and wire 138 to the other side of the secondary of transformer 112. In this manner, boiler 10 is operated as the secondary temperature changer and its proper pilot light 115 is energized as explained above.

In this manner, by simply throwing manual switch 68 to one or the other of its positions, either the boiler 10 or the boiler 11 may be utilized as the primary temperature changer and the other remaining boiler is utilized as the secondary temperature changer. The pilot lights 117 and 118 indicate which of the boilers 10 or 11 is operating as the primary temperature changer. Other than this choosing as to which of the boilers 10 or 11 shall be the primary temperature changer and which shall be the secondary temperature changer, operation of manual switch 68 has no further effect upon the system and its general operation both on the day cycle and the night cycle and under manual supervision by operation of the manual switches 60 and 64 remains the same as heretofore explained.

It will be apparent that many changes in the specific embodiment herein disclosed can be made by those skilled in the art and I therefore intend to be limited only by the scope of the appended claims.

I claim:

1. In combination, a primary temperature changing device, means responsive to a condition directly produced by said device for normally controlling the same to maintain a predetermined temperature changing capacity, a secondary temperature changing device, thermostatic means responsive to outdoor temperature, and means dominated by said thermostatic means and responsive to the temperature changing capacity produced by said primary temperature changing means for placing said secondary temperature changing device into operation only when the outdoor temperature reaches a predetermined value and the temperature changing capacity produced by the first temperature changing device reaches a given minimum value.

2. In combination, a primary temperature changing device, means responsive to a condition directly produced by said device for normally controlling the same to maintain a predetermined temperature changing capacity, a secondary temperature changing device, thermostatic means responsive to outdoor temperature, means dominated by said thermostatic means and responsive to the value of the temperature changing capacity produced by said primary temperature changing device for placing said secondary temperature changing device into operation only when the outdoor temperature reaches a predetermined value and said temperature changing capacity reaches a given minimum value and means for selectively interchanging said temperature changing devices to render either of them the primary temperature changing device and the other the secondary changing device.

3. In combination, a primary temperature changing device, means responsive to a condition directly produced by said device for normally controlling the same to maintain a predetermined temperature changing capacity, a secondary temperature changing device, thermostatic means responsive to outdoor temperature, means dominated by said thermostatic means and responsive to the temperature changing capacity produced by said primary temperature changing device for placing said secondary temperature changing device into operation only when the outdoor temperature reaches a predetermined value and said temperature changing capacity reaches a given minimum value, a third temperature changing device, and means responsive to a still lower temperature changing capacity for operating the third temperature changing device irrespective of the outdoor temperature.

4. In combination, a primary temperature changing device, means responsive to a condition directly produced by said device for normally controlling the same to maintain a predetermined temperature changing capacity, a secondary temperature changing device, thermostatic means responsive to outdoor temperature, means dominated by said thermostatic means and responsive to a condition produced by said primary temperature changing device for placing said secondary temperature changing device into operation only when the outdoor temperature reaches a predetermined value and the condition produced by the first temperature device reaches a given value, a thermostat responsive to the temperature of the space to be controlled, and timing means associated with said space temperature responsive thermostat for placing the same in control of said temperature changing devices.

5. In combination, a primary temperature changing device, means responsive to a condition directly produced by said device for normally controlling the same to maintain a predetermined temperature changing capacity, a secondary temperature changing device, thermostatic means responsive to outdoor temperature, means dominated by said thermostatic means and responsive to a condition produced by said primary temperature changing device for placing said second temperature changing device into operation only when the outdoor temperature reaches a predetermined value and the condition produced by the first temperature device reaches a given value and manual means for simultaneously operating both said temperature changing devices from said first named means irrespective of outdoor temperatures.

6. A temperature control system, comprising, in combination, a plurality of temperature changing devices for changing the heat content of a circulating fluid, means responsive to the heat content of the temperature changing fluid, connections between said means and one of said temperature changing devices for placing the latter into operation when the heat content of the temperature changing fluid reaches a given value, a thermostat responsive to outdoor temperature, and connections between said means, the thermostat and another of said temperature changing devices for placing the latter in operation only when the outdoor temperature reaches a given value and the heat content of the circulating fluid reaches a value different than said first-named value.

7. A temperature control system, comprising, in combination, a plurality of temperature changing devices for changing the heat content of a circulating fluid, means responsive to the heat content of the temperature changing fluid, connections between said means and one of said temperature changing devices for placing the latter into operation when the heat content of the temperature changing fluid reaches a given value, a thermostat responsive to outdoor temperature, connections between said means, the thermostat and another of said temperature changing devices for placing the latter in operation only when the outdoor temperature reaches a given value and the heat content of the circulating fluid reaches a value different than said first-named value and means for reversing the connections to said temperature changing devices whereby either may be utilized as the primary temperature changing device.

8. A temperature control system, comprising, in combination, a plurality of temperature changing devices for changing the heat content of a circulating fluid, means responsive to the heat content of the temperature changing fluid, connections between said means and one of said temperature changing devices for placing the latter into operation when the heat content of the temperature changing fluid reaches a given value, a thermostat responsive to outdoor temperature, connections between said means, the thermostat and another of said temperature changing devices for placing the latter in operation only when the outdoor temperature reaches a given value and the heat content of the circulating fluid reaches a value different than said first-named value and connections between said means and a third one of said temperature changing devices for operating the latter when the heat content of the circulating fluid reaches a third value.

9. In a heating system, in combination, a plurality of heaters for heating a circulating fluid, means responsive to the heat content of the circulating fluid, connections between said means and one of said heaters for placing the same into operation when the heat content of the circulating fluid falls to a first value, a thermostat responsive to a temperature other than that of the circulating fluid, and connections between said means, thermostat and another of the heaters for placing the latter into operation when the heat content of the circulating fluid falls to a lower value and said temperature falls to a predetermined value.

10. In a heating system, in combination, a plurality of heaters for heating a circulating fluid, means responsive to the heat content of the circulating fluid, connections between said means and one of said heaters for placing the same into operation when the heat content of the circulating fluid falls to a first value, a thermostat responsive to outdoor temperatures, connections between said means, thermostat and another of the heaters for placing the latter into operation when the heat content of the circulating fluid falls to a lower value and the outdoor temperature falls to a predetermined value, a thermotat responsive to the temperature of the space to be heated, timing means, and connections between said timing means and space temperature responsive thermostat for placing the latter in dominating control of said heaters.

11. In a heating system, in combination, a plurality of heaters for heating a circulating fluid, means responsive to the heat content of the circulating fluid, connections between said means and one of said heaters for placing the same into operation when the heat content of the circulating fluid falls to a first value, a thermostat responsive to outdoor temperatures, connections between said means, thermostat and another of the heaters for placing the latter into operation when the heat content of the circulating medium falls to a lower value and the outdoor temperature falls to a predetermined value and means for controlling the flow of said circulating fluid.

12. In a temperature controlling system, in combination, a plurality of temperature changers for changing the heat content of a circulating fluid, a plurality of electrically operated devices for increasing the output of each of said temperature changers, first and second switches responsive to the heat content of the circulating fluid which close when the heat content thereof reaches different values, a switch responsive to a temperature other than that of the circulating fluid, a control circuit for one of said devices controlled by said first switch, and a control circuit for another of said devices controlled by said second switch and said temperature responsive switch.

13. In a temperature controlling system, in combination, a plurality of temperature changers for changing the heat content of a circulating fluid, a plurality of electrically operated devices for increasing the output of each of said temperature changers, first and second switches responsive to the heat content of the circulating fluid which close when the heat content thereof reaches different values, a switch responsive to outdoor temperatures, a control circuit for one of said devices controlled by said first switch, a control circuit for another of said devices controlled by said second switch and said outdoor temperature responsive switch, a space temperature responsive switch, and time controlled means for placing said space temperature responsive switch in control of both of said control circuits.

14. In a temperature controlling system, in combination, a plurality of temperature changers for changing the heat content of a circulating fluid, a plurality of electrically operated devices for increasing the output of each of said temperature changers, first and second switches responsive to the heat content of the circulating fluid which close when the heat content thereof reaches different values, a switch responsive to a temperature other than that of the circulating fluid, a control circuit for one of said devices controlled by said first switch, a control circuit for another of said devices controlled by said second switch and said temperature responsive switch, and means in control of the flow of circulating fluid.

15. In combination, first and second boilers for generating a supply of steam, a steam pressure responsive device for placing one of said boilers into operation when the steam pressure falls to a given minimum, a second steam pressure responsive device, a thermostat responsive to a temperature other than that of the steam, and connections between said second steam pressure responsive device and said thermostat for operating the other of said boilers when the steam pressure falls to a second minimum lower than said first minimum and the temperature to which said thermostat responds falls to a given value.

16. In combination, first and second boilers for generating a supply of steam, a steam pressure responsive device for placing one of said boiler into operation when the steam pressure falls to a given minimum, a second steam pressure responsive device, a thermostat responsive to outdoor temperatures, connections between said second steam pressure responsive device and said thermostat for operating the other of said boilers when the steam pressure falls to a second minimum lower than said first minimum and the outdoor temperature falls to a given value, a plurality of radiators connected to said boilers, and automatic means for controlling the flow of steam through said radiators.

17. In a heating system, in combination, first and second boilers for generating steam and connected to a single main, a first switch responsive to the pressure in said main which closes when the steam pressure therein falls to a given value, a second switch responsive to the pressure in said main which closes when the steam pressure therein falls to a still lower value, a thermostatic switch responsive to outdoor temperatures which closes when the outdoor temperature falls to a given value, electrically operable means in control of said boilers, and two circuits for said last-named means, one controlled by said first switch and the other controlled by said thermostatic switch and said second switch.

18. In a heating system, in combination, first and second boilers for generating steam and connected to a single main, a first switch responsive to the pressure in said main which closes when the steam pressure therein falls to a given value, a second switch responsive to the pressure in said main which closes when the steam pressure therein falls to a still lower value, a thermostatic switch responsive to outdoor temperatures which closes when the outdoor temperature falls to a given value, electrically operable means in control of said boilers, two circuits for said last-named means, one controlled by said first switch and the other controlled by said thermostatic switch and said second switch, a plurality of radiators connected to said main, and separate controls responsive to the temperatures of individual spaces in control of the flow of steam through said radiators.

19. In combination, a pair of temperature changers an electrically operable device in control of each of said temperature changers, first and second switches responsive to the output of said temperature changers which close at different values, a temperature responsive switch, a first control circuit including said first switch, a second control circuit including said second switch and said temperature responsive switch, and reversing switching mechanism for selectively placing said first control circuit in control of either one of said devices and the second control circuit in control of the other of said devices.

20. In combination, a pair of temperature changers, an electrically operable device in control of each of said temperature changers, first and second switches responsive to the output of said temperature changers which close at different values, a temperature responsive switch, a first control circuit including said first switch, a second control circuit including said second switch and said temperature responsive switch, reversing switching mechanism for selectively placing said first control circuit in control of either one of said devices and the second control circuit in control of the other of said devices, a third temperature changer, a third electrically operable device in control thereof, a fourth switch responsive to the output of said temperature changer which closes at a third output value, and a control circuit for said third device controlled by said fourth switch.

21. In combination, a pair of temperature changers, an electrically operable device in control of each of said temperature changers, first and second switches responsive to the output of said temperature changers which close at different values, an outdoor temperature responsive switch, a first control circuit including said first switch, a second control circuit including said second switch and said outdoor temperature responsive switch, reversing switching mechanism for selectively placing said first control circuit in control of either one of said devices and the second control circuit in control of the other of said devices, a space temperature responsive thermostatic switch, a time operated switch, and connections for placing said space temperature thermostatic switch in command of said two control circuits under the control of said time operated switch.

22. In combination, a plurality of condition changing devices, means responsive to demands operative to place said condition changing devices into successive operation as the demands thereon increase, means to change the order in which said devices are placed in operation upon such increase in the demands whereby different ones of said condition changing devices may be selectively operated as the primary condition changing device, means responsive to a condition to be controlled, and timing means to place said last-named means in control of said condition changing devices.

23. In combination, a plurality of devices operative to change the condition of a circulating fluid, means responsive to demands operative to place said devices successively into operation, means to change the order in which said devices are brought into operation, and means responsive to a condition to be controlled in positive control of the circulation of said fluid.

24. In a temperature control system, in combination, first and second temperature changing devices, condition responsive means responsive to demands to successively bring said first and second temperature changing devices into operation, and means responsive to a condition other than the condition said first-named condition responsive means responds to, to prevent operation of one of said temperature changing devices.

25. In a temperature control system for a space, in combination, first and second temperature changers to vary the temperature in the space, means responsive to demands to place said first and second temperature changers in operation in sequence at predetermined demands, and means responsive to an external condition to prevent operation of said second temperature changer unless said external condition reaches a predetermined value.

JOHN T. MIDYETTE, Jr.